US010033273B1

(12) United States Patent
Chen (10) Patent No.: US 10,033,273 B1
(45) Date of Patent: Jul. 24, 2018

(54) SYSTEM AND METHOD FOR CONTROLLING SWITCHING POWER SUPPLY

(71) Applicant: SEMICONDUCTOR COMPONENTS INDUSTRIES, LLC, Phoenix, AZ (US)

(72) Inventor: Gang Chen, Taipo (HK)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/398,910

(22) Filed: Jan. 5, 2017

(51) Int. Cl.
*H02M 3/157* (2006.01)
*H02M 3/156* (2006.01)
*H02M 1/08* (2006.01)
*H02M 1/00* (2006.01)

(52) U.S. Cl.
CPC ............ *H02M 3/156* (2013.01); *H02M 1/08* (2013.01); *H02M 2001/0048* (2013.01)

(58) Field of Classification Search
CPC ........ H02M 1/08; H02M 3/155–3/158; H02M 2001/0048; G05F 1/40; G05F 1/44; G05F 1/56; G05F 1/575
USPC ................. 323/265, 273, 282–285, 288, 351
See application file for complete search history.

(56) References Cited

U.S. PATENT DOCUMENTS

| 7,595,617 | B2 | 9/2009 | Schiff |
| 9,007,048 | B2 | 4/2015 | Chen et al. |
| 2005/0104570 | A1* | 5/2005 | Lee ............... H03F 3/217 323/282 |
| 2014/0015580 | A1* | 1/2014 | Chang ............ H03K 4/50 327/170 |
| 2014/0035362 | A1* | 2/2014 | Scherr ........... B60R 21/0173 307/10.1 |
| 2014/0176027 | A1* | 6/2014 | Osaki ............. H02P 6/002 318/400.2 |

OTHER PUBLICATIONS

Gang Chen et al. "Multi-Phase Control for Pulse Width Modulation Power Converters", U.S. Appl. No. 15/398,912, filed Jan. 5, 2017.

\* cited by examiner

*Primary Examiner* — Adolf Berhane
(74) *Attorney, Agent, or Firm* — AMPACC Law Group, PLLC (57) ABSTRACT

A switching power supply includes a signal generator providing a selected signal according to a first signal and a second signal, a controller generating a modulation signal in response to the selected signal, and a power converter converting an input signal into an output signal in response to the modulation signal. The first signal has a first ripple amplitude, and the second signal has a second ripple amplitude less than the first ripple amplitude.

20 Claims, 8 Drawing Sheets

SYSTEM AND METHOD FOR CONTROLLING SWITCHING POWER SUPPLY

BACKGROUND

This present disclosure relates to integrated circuit devices, and more particularly to a switching power supply.

A conventional switching power supply includes a switching regulator to control conversion of electrical power, and such a switching regulator includes one or more of switching elements operating in response to a modulation signal. Under a high frequency load transient condition, a switching frequency of the modulation signal may exceed a nominal operating frequency of the switching regulator, leading to an increase of switching loss of the switching elements.

The conventional switching power supply may be a multi-phase power supply, which includes a plurality of inductors. Under the high frequency load transient condition, a current imbalance among a plurality of currents respectively flowing through the plurality of inductors may occur, leading to an electrical and thermal stress on one or more of the plurality of inductors.

DETAILED DESCRIPTION

Figure 1:
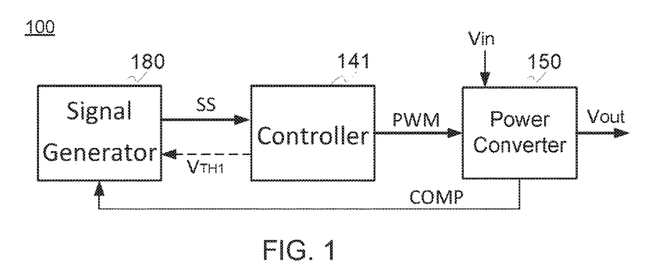
FIG. 1 illustrates a switching power supply, according to an embodiment.

FIG. 1 illustrates a switching power supply 100 according to an embodiment. The switching power supply 100 includes a signal generator 180, a controller 141, and a power converter 150.

The power converter 150 converts an input signal (or an input voltage) Vin and provides an output signal (or an output voltage) Vout to a load. The load may include one or more integrated circuits (ICs). In an embodiment, the output voltage Vout is used as a supply voltage to one or more of a Central Processing Unit (CPU), a Graphics Processing Unit (GPU), a memory integrated circuit, and the like.

The power converter 150 also provides a comparison signal COMP (or a first signal) indicative of a level of the output voltage Vout to the signal generator 180. In an embodiment, the power converter 150 includes an amplifier outputting the first signal COMP to the signal generator 180. In an embodiment, the power converter 150 further includes a compensation network (not shown). For example, such a compensation network may be connected to a node receiving the first signal COMP, a feedback signal and a ground, or connected to a node receiving the first signal COMP and the ground.

The signal generator 180 provides a selected signal SS according to the first signal COMP having a first ripple amplitude and according to a second signal having a second ripple amplitude lower than the first ripple amplitude. For example, the first ripple amplitude is a peak magnitude of the first signal COMP that deviates from a direct current (DC) value of the first signal COMP. The first signal COMP may have a first frequency and the second signal has a second frequency lower than the first frequency. For example, the second signal has a dominant frequency lower than a dominant frequency of the first signal COMP. In an embodiment, the second signal is a filtered version of the first signal COMP, and the signal generator 180 provides the second signal as the selected signal SS when the first frequency of the first signal COMP is equal to or greater than a threshold frequency.

In another embodiment, the second signal is a threshold signal (or a threshold voltage) $V_{TH1}$ output from the controller 141, which is an adaptive DC voltage or a quasi-steady DC voltage. The signal generator 180 provides the threshold signal $V_{TH1}$ as the selected signal SS when the frequency of the first signal COMP is equal to or greater than the threshold frequency.

The controller 141 generates a pulse width modulated (PWM) signal (or a modulation signal) PWM in response to the selected signal SS. In an embodiment, the controller 141 implements a ramp pulse modulation (RPM) scheme.

Figure 2:
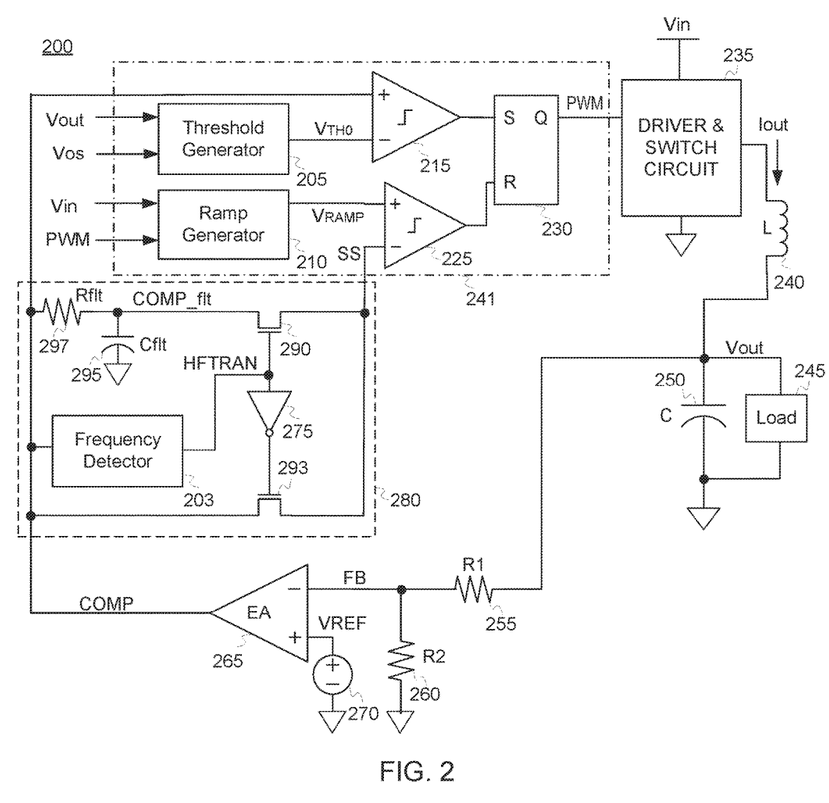
FIG. 2 illustrates a switching power supply, according to an embodiment.

FIG. 2 illustrates a switching power supply 200 suitable for use as the switching power regulator 100 of FIG. 1, according to an embodiment. The switching power supply 200 includes a driver and switch circuit 235, an output inductor 240, an output capacitor 250, a load 245, first and second resistors 255 and 260, an error amplifier 265, a reference voltage source 270, a signal generator 280, and a controller 241. The controller 241 includes a threshold generator 205, a ramp generator 210, first and second comparators 215 and 225, and a set/reset (RS) flip-flop 230.

The switching power supply 200 receives an input voltage Vin and converts the received input voltage Vin into an output voltage Vout. Although the switching power supply 200 shown in FIG. 2 includes a DC-DC buck converter, embodiments of the present disclosure are not limited thereto. In an embodiment, the switching power supply 200 includes a boost converter, a buck-boost converter, a boost-buck converter, a flyback converter, or the like.

The threshold generator 205 generates a threshold signal (or a threshold voltage) $V_{TH0}$, which is a DC voltage or a quasi-steady DC voltage plus a ripple voltage. In an embodiment, the threshold generator 205 generates the threshold voltage $V_{TH0}$ according to the output voltage Vout and an offset voltage Vos. For example, the threshold voltage $V_{TH0}$ output from the threshold generator 205 can be represented by Equation 1 below:

$$V_{TH0} = A_1 V_{out} + V_{os} \qquad \text{Equation 1.}$$

In Equation 1, $A_1$ denotes a first scaling factor. In an embodiment, the output voltage Vout may be a source of the ripple voltage. In another embodiment, the ripple voltage may be generated and added to the threshold voltage $V_{TH0}$.

In an embodiment, the threshold generator 205 includes a resistor divider (not shown) receiving the output voltage Vout and generating a divided version of the output voltage Vout according to a predetermined ratio. The threshold generator 205 further includes an adder (not shown) that adds the divided version of the output voltage Vout and the offset voltage Vos.

The ramp generator 210 generates a ramp signal (or a ramp voltage) $V_{RAMP}$. In an embodiment, the ramp generator 210 generates the ramp voltage $V_{RAMP}$ according to the input voltage Vin, the offset voltage Vos, and a modulation signal PWM. The ramp signal $V_{RAMP}$ ramps up when the modulation signal PWM has an ON value (e.g. a high value) and is clamped to ground or an offset voltage Vos when the modulation signal PWM has an OFF value (e.g. a low value). The ramp slew rate when the modulation signal PWM has the ON value may be proportional to the input voltage Vin to provide an input feedforward function.

Figure 3:
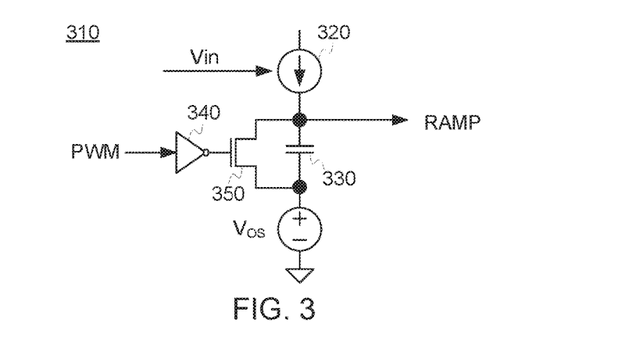
FIG. 3 illustrates a ramp generator, according to an embodiment.

FIG. 3 illustrates a ramp generator 310 suitable for use as the ramp generator 210 of FIG. 2 according to an embodiment. The ramp generator 310 includes an adjustable current source 320 that operates in response to an input voltage Vin (e.g., the input voltage Vin of FIG. 2). The ramp generator 210 further includes a capacitor 330, an inverter 340, and a switching device 350 having a gate terminal that receives an inverted version of a modulation signal PWM (e.g., the modulation signal PWM of FIG. 2).

During an on-time of the modulation signal PWM, the switching device 350 is turned off and the adjustable current source 320 charges the capacitor 330 to increase a level of a ramp voltage $V_{RAMP}$. During an off-time of the modulation signal PWM, the switching device 350 is turned on and the level of the ramp voltage RAMP is maintained substantially equal to the offset voltage Vos (e.g., the offset voltage Vos of FIG. 2).

Referring back to FIG. 2, the first comparator 215 has a negative terminal receiving the threshold voltage $V_{TH0}$ and a positive terminal receiving a first comparison signal (or a first signal) COMP, which is output from the error amplifier 265. The first comparator 215 compares the threshold voltage $V_{TH0}$ and the first comparison signal COMP, and outputs a signal indicative of the comparison result to a Set (S) input of the Reset-Set (RS) flip-flop 230.

The second comparator 225 has a positive terminal receiving the ramp voltage $V_{RAMP}$ and a negative terminal receiving a selected signal SS. The second comparator 225 compares the ramp voltage $V_{RAMP}$ and the selected signal SS, ant outputs a signal indicative of the comparison result to a Reset (R) input of the RS flip-flop 230. The RS flip-flop 230 generates the modulation signal PWM in response to the comparison results from the first and second comparators 215 and 225.

Figure 4:
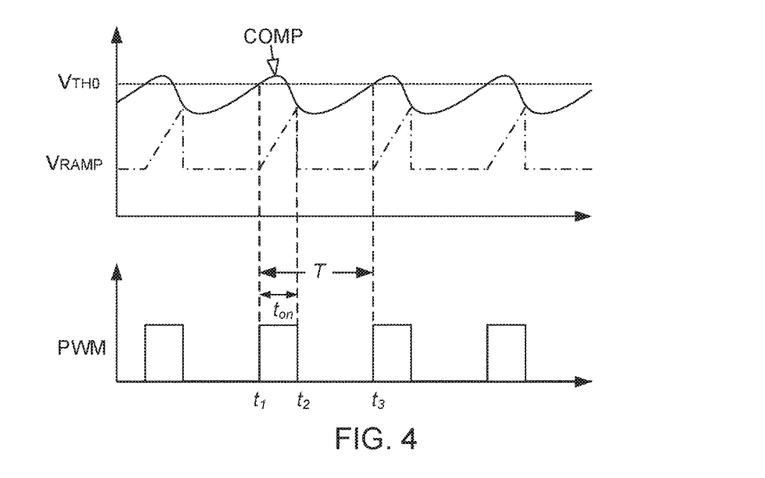
FIG. 4 illustrates waveforms related to an operation of the switching power supply of FIG. 2 in a steady state, according to an embodiment.

An operation of the switching power supply of FIG. 2 in a steady state will be described below with reference to FIG. 4. FIG. 4 illustrates waveforms of the first comparison signal COMP, the threshold voltage $V_{TH0}$, and the ramp voltage $V_{RAMP}$ when the second comparator 225 receives the first comparison signal COMP as the selected signal SS.

At a first time $t_1$, the first comparison signal COMP reaches the threshold voltage $V_{TH0}$, and thus the first comparator 215 causes the RS flip-flop 230 to output the modulation signal PWM indicative of a first logic value (e.g., a logic high value). As a result, a switching device (not shown) included in the driver and switch circuit 235 is turned on to cause a current Iout to flow through the inductor 240. When the current Iout initially increases, the inductor 240 produces an opposing voltage across its terminals, resulting in a decrease in the output voltage Vout to increase the first comparison signal COMP. Then, when a rate of change in the current Iout decreases, the produced voltage across the inductor 240 decreases, resulting in an increase in the output voltage Vout to decrease the first comparison signal COMP.

At a second time t2, the first comparison signal COMP reaches the ramp voltage $V_{RAMP}$, and thus the second comparator 225 causes the RS flip-flop 230 to output the modulation signal PWM indicative of a second logic value (e.g., a logic low value). When the modulation signal PWM has the second logic low value, the ramp generator 210 generates the ramp voltage $V_{RAMP}$ having a level substantially equal to the offset voltage Vos.

Under a load transient condition, the switching power supply 200 may change a pulse width $t_{on}$ and a switching frequency of the modulation signal PWM. When a load transient frequency is lower than a threshold frequency, an average value of the switching frequency of the modulation signal PWM remains proximate to a nominal operating frequency of the switching power supply 200. In an embodiment, the threshold frequency is in a range from 30% to 50% of a nominal operating frequency of the switching power supply 200.

However, when the load transient frequency is substantially equal to or greater than the threshold frequency, the average value of the switching frequency of the modulation signal PWM may increase to exceed the nominal operating frequency of the switching power supply 200. The driver and switch circuit 235 includes one or more of switching elements (not shown) and switching loss of these switching elements (not shown) is proportional to the switching frequency of the modulation signal PWM. Thus, such a high switching frequency of the modulation signal PWM increases the switching loss of the switching elements in the driver and switch circuit 235.

In order to address the above issues, referring back to FIG. 2, the signal generator 280 receives the first comparison signal COMP and generates a second comparison signal (or a second signal) COMP_flt that has a ripple amplitude lower than the first comparison signal COMP. The second comparison signal COMP_flt has a frequency lower than the first comparison signal COMP. When the frequency of the first comparison signal COMP, which corresponds to the load transient frequency, is lower than the threshold frequency, the signal generator 280 outputs the first comparison signal COMP to the negative terminal of the second comparator 225 as the selected signal SS. When the frequency of the first comparison signal COMP is equal to or greater than the threshold frequency, the signal generator 280 outputs the second comparison signal COMP_flt to the negative terminal of the second comparator 225 as the selected signal SS.

The signal generator 280 includes a filter resistor 297, a filter capacitor 295, a first switching device 290, an inverter 275, a second switching device 293, and a frequency detector 203. A low-pass filter including the filter resistor 297 and the filter capacitor 295 generates the second comparison signal COMP_flt having the ripple amplitude lower than the first comparison signal COMP. In an embodiment, a time constant of the low-pass filter is equal to or greater than 3 times of a nominal PWM switching period of the switching power supply 200.

The frequency detector 203 compares the frequency of the first comparison signal COMP to the threshold frequency and outputs a transition signal HFTRAN in response to the comparison result. When the frequency of the first comparison signal COMP is less than the threshold frequency, the frequency detector 203 outputs the transition signal HFTRAN indicative of a first logic value (e.g., a logic low value). As a result, the first switching device 290 is turned off and the second switching device 293 is turned on to provide the first comparison signal COMP as the selected signal SS to the second comparator 225.

When the frequency of the first comparison signal COMP is equal to or greater than (i.e., not less than) the threshold frequency, the frequency detector 203 outputs the transition signal HFTRAN indicative of a second logic value (e.g., a logic high value). As a result, the first switching device 290 is turned on and the second switching device 293 is turned off to provide the second comparison signal COMP_flt as the selected signal SS to the second comparator 225.

When the frequency of the first comparison signal COMP is equal to or greater than the threshold frequency, the modulation signal PWM is generated using the second comparison signal COMP_flt that has the ripple amplitude lower than the first comparison signal COMP, and thus the switching frequency of the modulation signal PWM remains proximate to the nominal operating frequency. As a result, the switching loss of the switching elements of the driver and switch circuit 235 is reduced compared to a conventional switching power supply, leading to less power consumption of the switching power supply 200 according to an embodiment.

Figure 5:
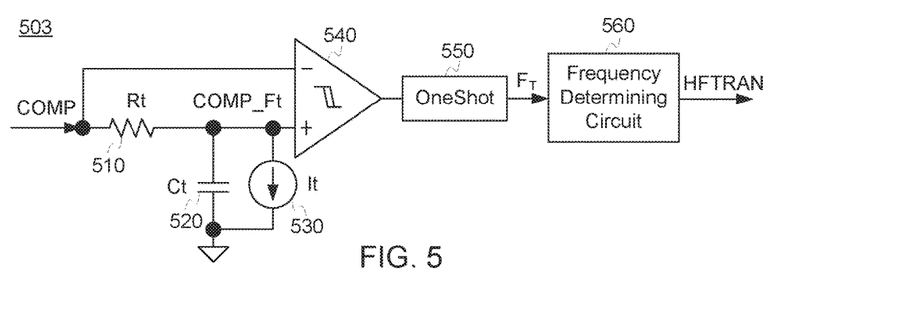
FIG. 5 illustrates a frequency detector, according to an embodiment.

FIG. 5 illustrates a frequency detector 503 suitable for use as the frequency detector 203 of FIG. 2. The frequency detector 503 includes a resistor 510, a capacitor 520, a current source 530, a comparator 540, a one-shot pulse generator 550, a frequency determining circuit 560.

The frequency detector 503 receives the first comparison signal COMP and generates a filtered version (or a filtered signal) COMP_Ft of the first comparison signal COMP using a low-pass filter that includes the resistor 510 and the capacitor 520. In an embodiment, a time constant of the low-pass filter is equal to or greater than the nominal switching period of a switching power supply. In another embodiment, a frequency detector (not shown) receives an output signal (e.g., the output signal Vout of FIG. 2), instead of the first signal COMP, and generates a filtered version of the output signal.

The frequency determining circuit 560 outputs a transition signal HFTRAN indicative of a logic high value, when a frequency of a pulse signal FT is equal to or greater than (i.e., not less than) a threshold frequency. In another embodiment, the frequency determining circuit 560 outputs the transition signal HFTRAN indicative of the logic high value, when the pulse signal $F_T$ is in a predetermined high frequency range. For example, when the pulse signal $F_T$ is in a range from 80% to 120% of an integer multiple of the nominal switching frequency, the output signal HFTRAN indicates the logic high value.

The current source 530 causes a current It to flow through the resistor 510 to a ground. Thus, the filtered signal COMP_Ft has a DC value, which is smaller than a DC value of the first comparison signal COMP by an offset value OV. The offset value OV is substantially equal to the multiplied value of a resistance value Rt of the resistor 510 and a magnitude of the current It. The offset value OV is determined to be sufficiently large to prevent the first comparison signal COMP from intersecting the filtered signal COMP_Ft when a switching power supply (e.g., the switching power supply 200 of FIG. 2) operates in a steady-state. For example, the offset value OV is greater than a half of an amplitude of the first comparison signal COMP in the stead state. In an embodiment, the offset value OV is in a range from 50 mV to 100 mV.

Figure 6:
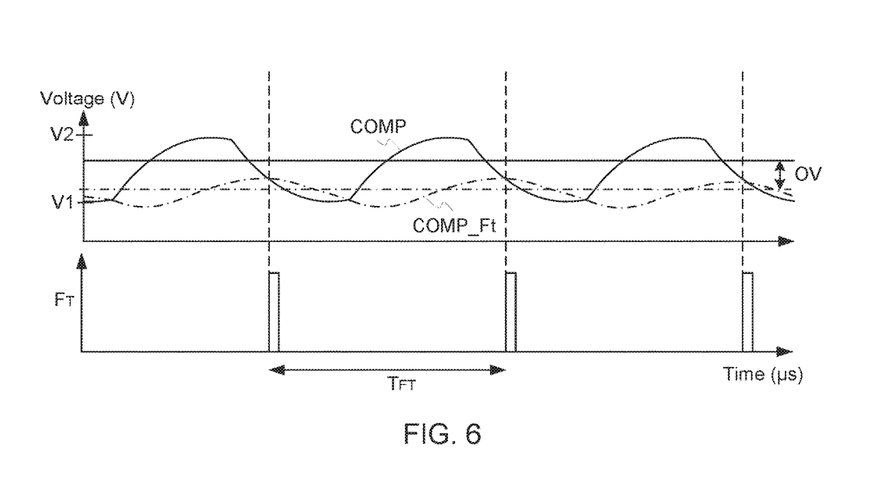
FIG. 6 illustrates waveforms related to an operation of the frequency detector of FIG. 5 under a load transient condition, according to an embodiment.

An operation of the frequency detector 503 under a load transient condition will be described below with reference to FIG. 6. Under the load transient condition, the amplitude of the first comparison signal COMP increases by a sufficiently large magnitude and at a sufficiently large slew rate to intersect the filtered signal COMP_Flt. At intersecting points in time, the comparator 540 provides an output signal indicative of a logic high value, and thus the one-shot pulse generator 550 generates a pulse signal Ft in response to the provided output signal. Because the first comparison signal COMP becomes smaller than the filtered signal COMP_Ft at a frequency substantially equal to a load transient frequency, the one-shot pulse generator 550 provides the pulse signal Ft at the frequency substantially equal to the load transient frequency to the frequency determining circuit 560.

Figure 7:
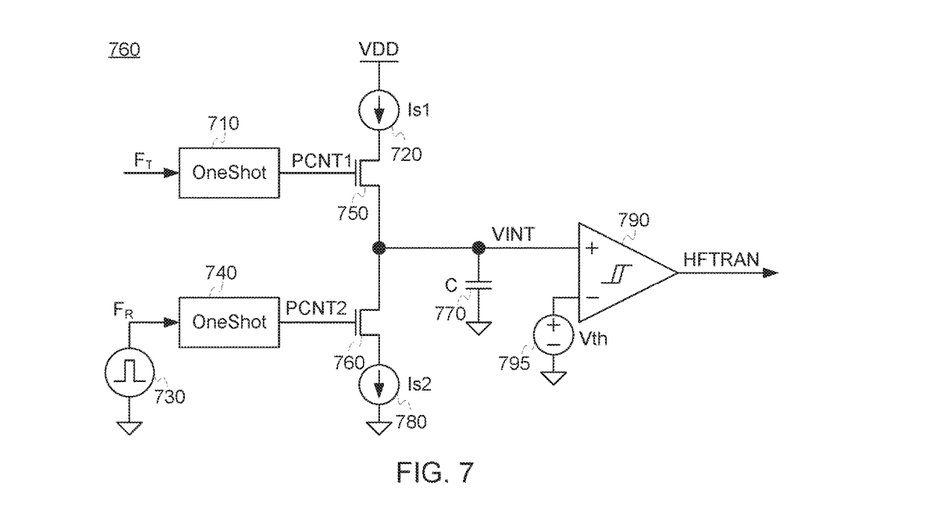
FIG. 7 illustrates a frequency determining circuit, according to an embodiment.

FIG. 7 illustrates a frequency determining circuit 760 suitable for use as the frequency determining circuit 560 of FIG. 5. The frequency determining circuit 760 includes first and second one-shot pulse generators 710 and 740, a reference pulse generator 730, first and second current sources 720 and 780, first and second switching devices 750 and 760, a capacitor 770, a threshold voltage source 795, and a comparator 790.

The first one-shot pulse generator 710 receives a pulse signal $F_T$ (e.g., the pulse signal $F_T$ of FIG. 5) having a load transient frequency and outputs a first control pulse signal PCNT1 having a predetermined width and a frequency substantially equal to the load transient frequency. In an embodiment, the first one-shot pulse generator 710 outputs the first control pulse signal PCNT1 indicative of a logic high value in response to a rising edge of the received pulse signal $F_T$.

During an on-time of the first control pulse signal PCNT1, the first switching device 750 is turned on to cause a first current Is1 to flow into the capacitor 770. As a result, the capacitor 770 is charged and an intermediate voltage VINT at a first end of the capacitor 770 increases during the on-time of the first control pulse signal PCNT1.

The second one-shot pulse generator 740 receives a reference pulse signal $F_R$ having a threshold frequency and outputs a second control pulse signal PCNT2 having a predetermined width and a frequency substantially equal to the threshold frequency. In an embodiment, the second one-shot pulse generator 740 outputs the second control pulse signal PCNT2 indicative of the logic high value in response to a rising edge of the received reference pulse signal $F_R$.

During an on-time of the second control pulse signal PCNT2, the second switching device 760 is turned on to cause a second current Is2 to flow from the capacitor 770 to a ground. As a result, the capacitor 770 is discharged and the intermediate voltage VINT at the first end of the capacitor 770 decreases during the on-time of the second control pulse signal PCNT2.

In an embodiment, the first current Is1 has a magnitude substantially equal to the second current Is2, and the on-time of the first control pulse signal PCNT1 is substantially equal to the on-time of the second control pulse signal PCNT2. Thus, when the frequency of the first control pulse signal PCNT1 is greater than the frequency of the second control pulse signal PCNT2, the intermediate voltage VINT at the first end of the capacitor 770 increases as a number of cycles of the first control pulse signal PCNT1 increases. Because the frequency of the first control pulse signal PCNT1 is substantially equal to the load transient frequency and the frequency of the second pulse control signal PCNT2 is substantially equal to the threshold frequency, the intermediate voltage VINT increases when the load transient frequency is greater than the threshold frequency.

When the increased intermediate voltage VINT exceeds a threshold voltage Vth, the comparator 790 outputs a transition signal HFTRAN (e.g., the transition signal HFTRAN of FIGS. 2 and 5) indicative of a logic high value. When the frequency determining circuit 760 outputs the transition signal HFTRAN indicative of the logic high value, a signal generator (e.g., the signal generator 280 of FIG. 2) including the frequency determining circuit 760 selects a signal (e.g., the second comparison signal COMP_flt of FIG. 2) other than another signal (e.g., the first comparison signal COMP of FIG. 2) output from an amplifier (e.g., the error amplifier 265 of FIG. 2). The selected signal has a ripple amplitude that is sufficiently low to keep a switching frequency of a modulation signal (e.g., the modulation signal PWM of FIG. 2) proximate to a nominal operating frequency. As a result, power consumption of a switching power supply (e.g., the switching power supply 200 of FIG. 2) according to an embodiment is reduced compared to a conventional switching power supply.

Figure 8:
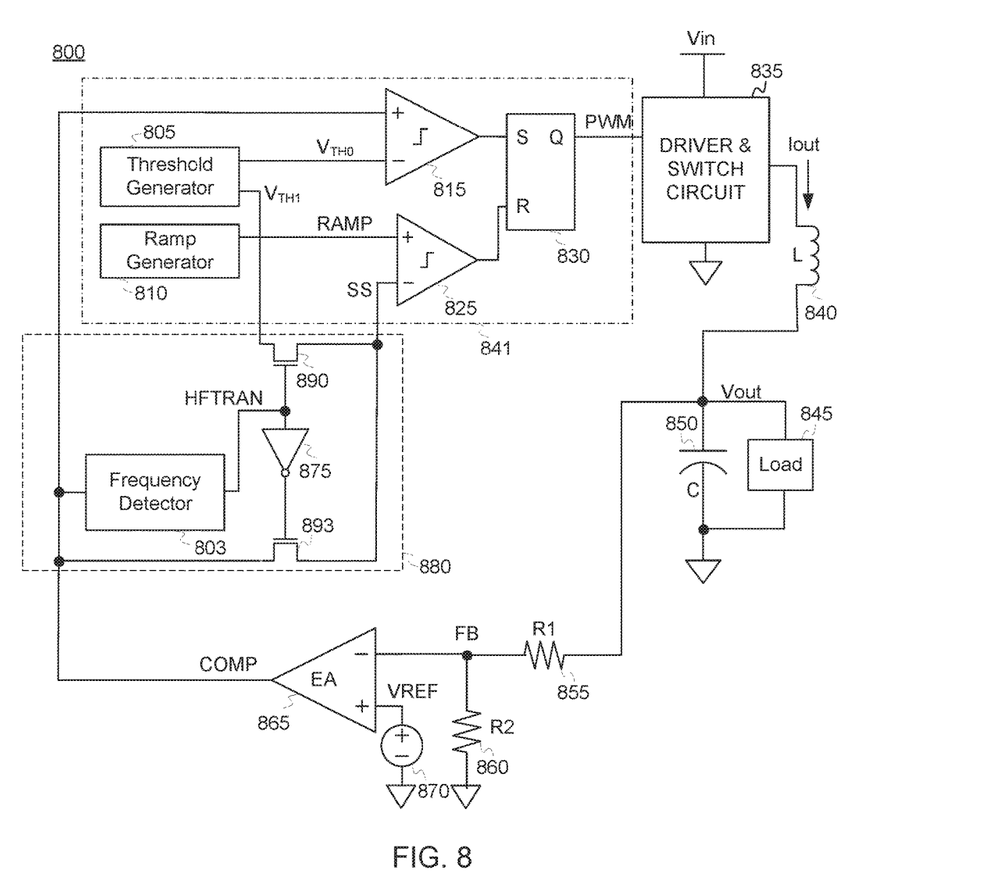
FIG. 8 illustrates a switching power supply, according to an embodiment.

FIG. 8 illustrates a switching power supply 800 suitable for use as the switching power regulator 100 of FIG. 1 according to an embodiment. The switching power supply 800 of FIG. 8 differs from the switching power supply 200 of FIG. 2 in that, in FIG. 8, a threshold generator 805 generates first and second threshold signals (or first and second threshold voltages) $V_{TH0}$ and $V_{TH1}$ and a signal generator 880 selects one of the second threshold signal $V_{TH1}$ and a comparison signal COMP as a selected signal SS.

The threshold generator 805 provides the first threshold signal $V_{TH0}$, which is substantially the same as the threshold voltage $V_{TH0}$ of FIG. 2, to a first comparator 815. The threshold generator 805 further provides the second threshold signal $V_{TH1}$, which is a DC voltage or a quasi-steady DC voltage, to the signal generator 880. In an embodiment, the second threshold signal $V_{TH1}$ has a DC level substantially equal to an averaged DC level of the first threshold signal $V_{TH0}$.

An operation of the signal generator 880 is similar to that of the signal generator 280 described above with reference to FIGS. 2-7, except that the signal generator 880 selects the second threshold signal $V_{TH1}$ as the selected signal SS, rather than a filtered signal (e.g., the second comparison signal COMP_flt of FIG. 2), when the frequency of the comparison signal COMP is equal to or greater than a threshold frequency. Thus, detailed descriptions of the operation of the signal generator 880 will be omitted herein for the interest of brevity.

Figure 9:
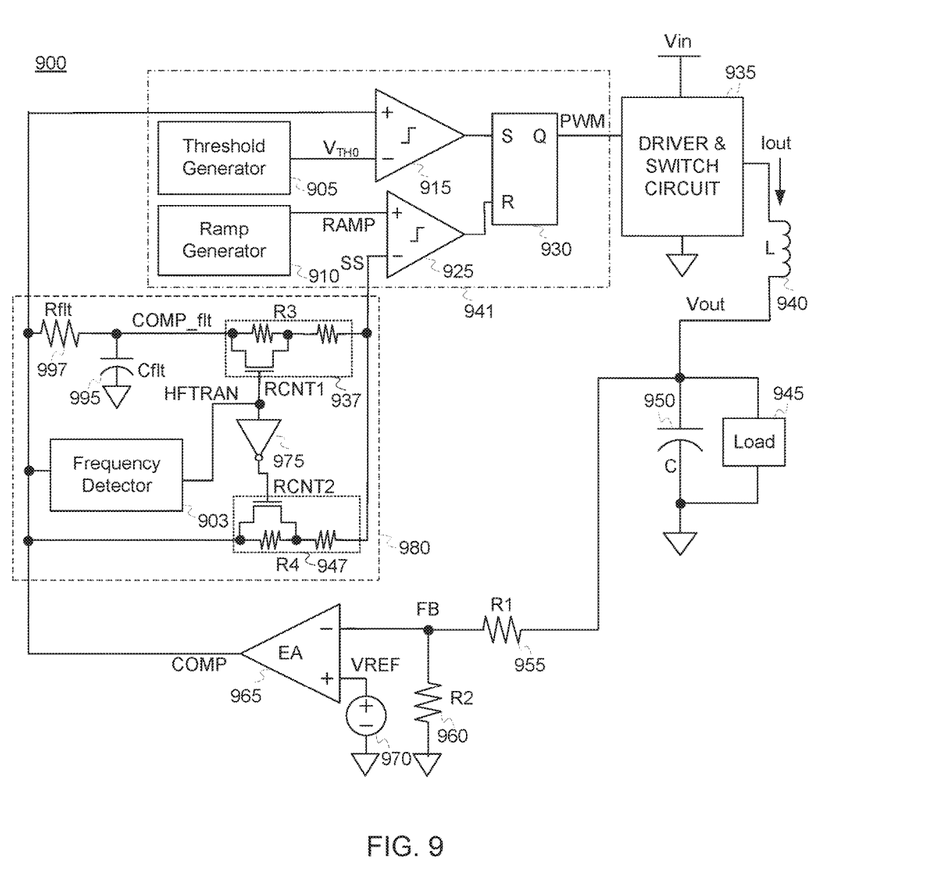
FIG. 9 illustrates a switching power supply suitable, according to an embodiment.

FIG. 9 illustrates a switching power supply 900 suitable for use as the switching power regulator 100 of FIG. 1 according to an embodiment. The switching power supply 900 of FIG. 9 differs from the switching power supply 200 of FIG. 2 in that, in FIG. 9, a signal generator 980 includes first and second variable resistors 937 and 947, rather than the first and second switching devices 290 and 293 and the inverter 275.

The signal generator 980 includes a frequency detector 903, which detects a frequency of a comparison signal COMP output from an error amplifier 965 and generates first and second resistance control signals RCNT1 and RCNT2 according to the detected frequency of the comparison signal COMP. The frequency detector 903 adjusts a ratio of a resistance value R3 over the first variable resistor 937 and a resistance value R4 of the second variable resistor 947 according to the detected frequency of the comparison signal COMP.

When the frequency of the comparison signal COMP increases, the frequency detector 903 decreases the resistance value R3 of the first variable resistor 937 and increases the resistance value R4 of the second variable resistor 947, leading to a decrease in the ratio of the resistance value R3 over the resistance value R4. As a result, a first component of the selected signal SS resulting from the comparison signal COMP gains less weight than a second component of the selected signal SS resulting from the filtered comparison signal COMP_flt.

The frequency detector 903 adjusts the ratio of the resistance value R3 over the resistance value R4 discretely. In an embodiment, when the frequency of the comparison signal COMP is less than the threshold frequency, the resistance value R3 of the first variable resistor 937 is in a first range from 90 kΩ to 100 kΩ and the resistance value R4 of the second variable resistor 947 is in a second range from 0Ω to 10 kΩ In such an embodiment, when the frequency of the comparison signal COMP is equal to or greater than the threshold frequency, the resistance value R3 of the first variable resistor 937 is in the second range from 0Ω to 10 kΩ and the resistance value R4 of the second variable resistor 947 is in the first range from 90 kΩ to 100 kΩ. Each of the variable first and second variable resistors 937 and 947 includes a switch and resistors. When the first resistance control signal RCNT1 has a logic high value, the switch in the first variable resistor 937 is closed and the resistance value R3 of the first variable resistor is reduced compared to when the first resistance control signal RCNT1 has a logic low value.

Although the frequency detector 903 according to the above-described embodiment adjusts the ratio of the resistance value R3 over the resistance value R4 in a single step, embodiments of the present disclosure are not limited thereto. In other embodiments, the frequency detector 903 adjusts the ratio of the resistance value R3 over the resistance value R4 in a plurality of steps.

In another embodiment, a frequency detector (not shown) adjusts the ratio of the resistance value R3 over the resistance value R4 continuously. For example, the frequency detector adjusts the ratio substantially linearly according to the frequency of the comparison signal COMP. In such an embodiment, the frequency detector (not shown) outputs the first and second resistance control signal RCNT1 and RCNT2 that are analog signals instead of digital signals, and thus changes the conduction resistances of the switches in the first variable resistor 937 and the second variable resistor 947, respectively. For example, the frequency detector (not shown) is configured to increase a level of the first resistance control voltage RCNT1 and decrease a level of the second control voltage RCNT2, when a frequency of a pulse signal (e.g., the pulse signal $F_T$ of FIG. 5) increases.

Figure 10:
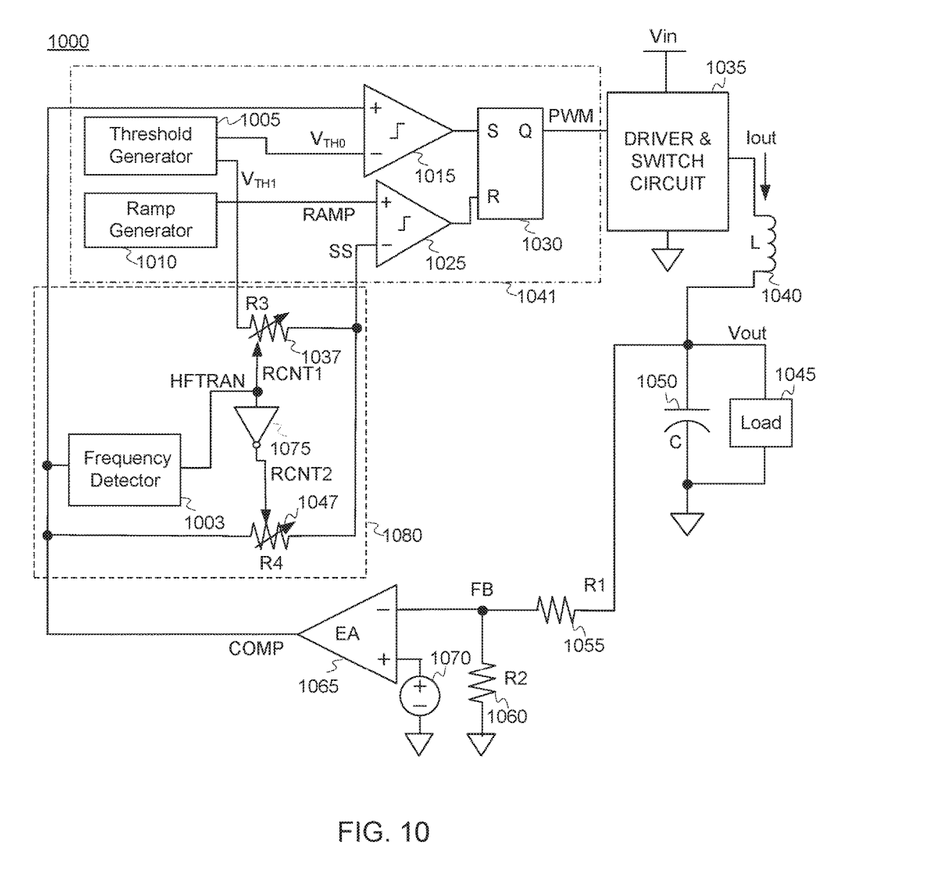
FIG. 10 illustrates a switching power supply, according to an embodiment.

FIG. 10 illustrates a switching power supply 1000 suitable for use as the switching power regulator 100 of FIG. 1 according to an embodiment. The switching power supply 1000 of FIG. 10 differs from the switching power supply 900 of FIG. 9 in that, in FIG. 10, a threshold generator 1005 generates first and second threshold signals (or first and second threshold voltages) $V_{TH0}$ and $V_{TH1}$.

When a frequency of a comparison signal COMP increases, a frequency detector 1003 decreases a resistance value R3 of a first variable resistor 1037 and increases a resistance value R4 of a second variable resistor 1047, leading to a decrease in the ratio of the resistance value R3 over the resistance value R4. As a result, a first component of the selected signal SS resulting from the comparison signal COMP gains less weight than a second component of the selected signal SS resulting from the second threshold signal $V_{TH1}$.

Figure 11:
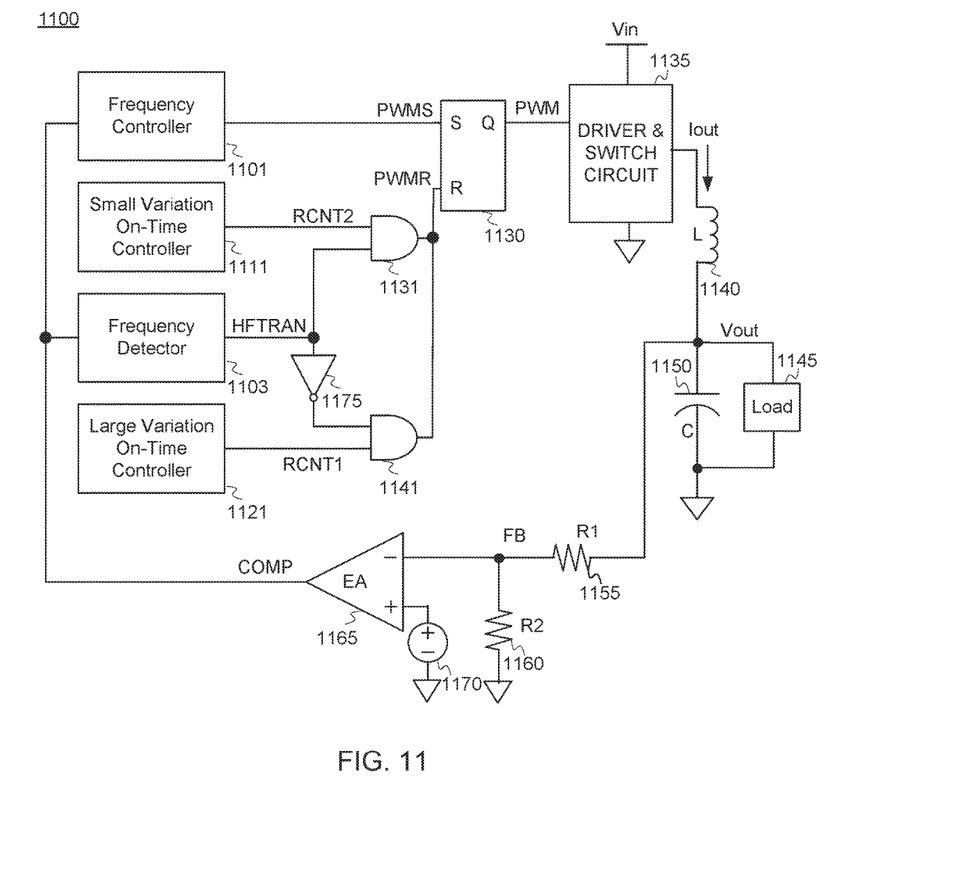
FIG. 11 illustrates a switching power supply suitable, according to an embodiment.

FIG. 11 illustrates a switching power supply 1100 suitable for use as the switching power regulator 100 of FIG. 1 according to an embodiment. The switching power supply 1100 includes a frequency controller 1101, a small variation on-time controller 1111, a large variation on-time controller 1121, first and second logic gates (or first and second AND gates) 1131 and 1141, an inverter 1175, a frequency detector 1103, and an RS flip-flop 1130. The frequency controller 1101 generates an output signal according to a comparison signal COMP and provides the generated output signal as a set signal PWMS to the RS flip-flop 1130.

An operation of the frequency detector 1103 is similar to that of the frequency detector 503 described above with reference to FIGS. 5-7. Thus, detailed descriptions of the operation of the frequency detector 1103 will be omitted herein for the interest of brevity.

When a load transient frequency is lower than a threshold frequency, the frequency detector 1103 outputs a transition signal HFTRAN indicative of a first logic value (e.g., a logic low value). The inverter 1175 provides an inverted version of the transition signal HFTRAN indicative of a second logic value (e.g., a logic high value) to the second AND gate 1141. The large variation on-time controller 1121 provides a first reset control signal RCNT1, which has an on-time varying according to the comparison signal COMP, to the second AND gate 1141. Thus, when the first reset control signal RCNT1 indicates the logic high value, the second AND gate 1141 provides an output signal indicative of the logic high value as a reset signal PWMR to the RS flip-flop 1130.

When the load transient frequency is equal to or greater than the threshold frequency, the frequency detector 1103 outputs the transition signal HFTRAN indicative of the logic high value. The small variation on-time controller 1111 provides a second reset control signal RCNT2, which has a substantially constant on-time, to the first AND gate 1131. Thus, when the second reset control signal RCNT2 indicates the logic high value, the first AND gate 1131 provides an output signal indicative of the logic high value as the reset signal PWMR to the RS flip-flop 1130. Because the RS flip-flop 1130 uses the second reset control signal RCNT2 having the substantially constant on-time as the reset signal PWMR to generate a modulation signal PWM, a switching frequency of the modulation signal PWM remains proximate to a nominal operating frequency.

Figure 12:
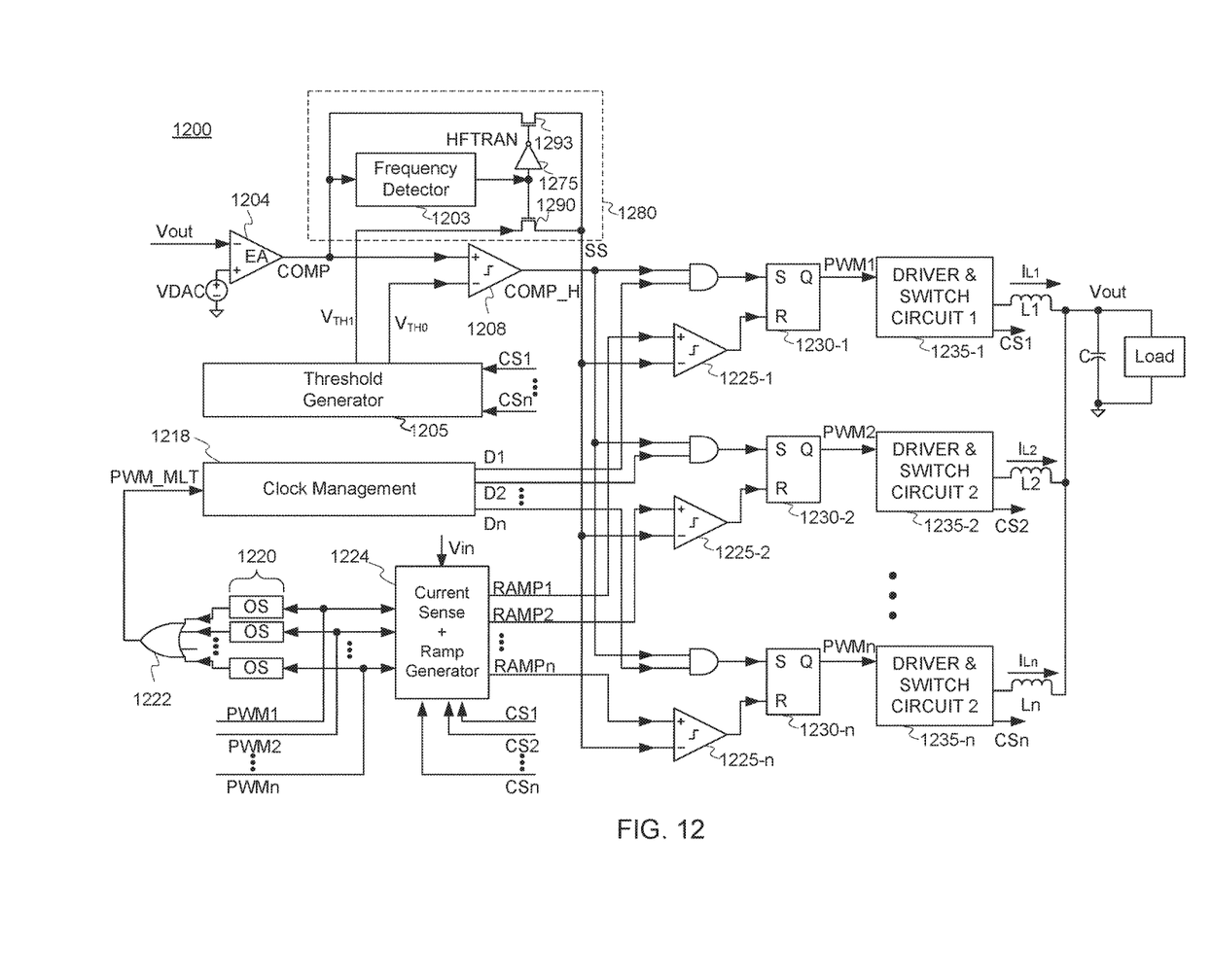
FIG. 12 illustrates a switching power supply, according to an embodiment.

FIG. 12 illustrates a switching power supply 1200 suitable for use as the switching power regulator 100 of FIG. 1 according to an embodiment. The switching power supply 1200 is a multi-phase power supply, which includes a plurality of RS flip-flops 1230-1 to 1230-$n$, a plurality of driver and switch circuits 1235-1 to 1235-$n$, a plurality of second comparators 1225-1 to 1225-$n$, a plurality of inductors L1 to Ln, and a signal generator 1280. The switching power supply 1200 further includes an Error Amplifier (EA) 1204, an error comparator 1208, a clock management circuit 1218, a plurality of one-shot circuits 1220, and an OR gate 1222, and a Current Sense plus Ramp (CSR) generator 1224.

The EA 1204 receives an output voltage Vout and a reference voltage VDAC and generates a comparison signal COMP with a value proportional to a difference between the output voltage Vout and the reference voltage VDAC. The error comparator 1208 compares the comparison signal COMP to a first threshold signal $V_{TH0}$ and outputs a compare high signal COMP_H having a high value when the comparison signal COMP is higher that the first threshold signal $V_{TH0}$ and having a low value otherwise.

The clock management circuit 1218 receives a pulse signal PWM_MLT and generates first to $n^{th}$ phase select signals D1 to Dn. During an initialization, the clock management circuit 1218 sets the first phase select signal D1 to an active state (e.g. a high state) and sets the second to $n^{th}$ phase select signal D2 to Dn to an inactive (e.g. low) state, indicating that the first phase is a selected phase. Subsequently, when an $i^{th}$ phase select signal D(i) has the active state, i is less than a number of phases n, and a pulse is received on the pulse signal PWM_MLT, the clock management circuit 1218 sets the $i^{th}$ phase select signal Di to the inactive state and sets the $(i+1)^{th}$ phase select signal Di+1 to the active state. When the $i^{th}$ phase select signal Di has the active state, i is equal to or smaller than the number of phases n, and a pulse is received on the pulse signal PWM_MLT, the clock management circuit 1218 sets the $n^{th}$ phase select signal Dn to the inactive state and the first phase select signal D1 to the active state.

Accordingly, the clock management circuit 1218 sets only one of the first to $n^{th}$ phase select signals D1 to Dn to the active state (i.e., as the active phase) at any time. The clock management circuit 1218 steps through the first to $n^{th}$ phase select signals D1 to Dn setting each to the active state (i.e., as the active phase) in turn when a pulse is received on the pulse signal PWM_MLT.

The plurality of one-shot (OS) circuits 1220 respectively receive first to $n^{th}$ PWM signals PWM1 to PWMn and respectively generate a pulse in response to positive edges of the first to $n^{th}$ PWM signals PWM1 to PWMn. In an embodiment, the pulse has a high value (e.g., a logical high value).

The OR gate 1222 receives the output signals of the plurality of one-shot circuits 1220 and generates the pulse signal PWM_MLT having a value equal to a logical OR of the values of the outputs of the plurality of one-shot circuits 1220. As a result, whenever any of the plurality of one-shot circuits 1220 generates a pulse having a high value on its output signal, the OR gate 1222 generates a pulse having a high value on the PWM signal PWM_MLT.

The CSR signal generator 1224 receives first to $n^{th}$ current sense (CS) signals CS1 to CSn, the first to $n^{th}$ PWM signals PWM1 to PWMn, and an input voltage Vin. The CSR signal generator 224 generates first to $n^{th}$ CSR signals RAMP1 to RAMPn according to the received signals.

The CSR signal generator 1224 generates the first CSR signal RAMP1 according to the first CS signal CS1, the first PWM signal PWM1, and the input voltage Vin. When the first PWM signal PWM1 has a low value, indicating that a first phase is in an inductor discharging state, the CSR signal generator 1224 generates the first CSR signal RAMP1 having a value equal to a DC offset voltage plus a voltage proportional to a value of the first CS signal CS1. When the first PWM signal PWM1 has a high value, indicating that the first phase is in an inductor charging state (i.e., on), the CSR signal generator 1224 increases the value of the first CSR signal RAMP1 at a rate proportional to the input voltage Vin. Thus, when the first PWM signal PWM1 has the high value, the first CSR signal RAMP1 has a value equal to a voltage proportional to the value of the first CS signal CS1 plus a value of a ramp that increases with time.

The CSR signal generator 1224 generates the second CSR signal RAMP2 according to the second CS signal CS2, the second PWM signal PWM2, and the input voltage Vin, in a manner analogous to how the CSR signal generator 1224 generates the first CSR signal RAMP1. The CSR signal generator 1224 generates the $n^{th}$ CSR signal RAMP2 according to the $n^{th}$ CS signal CSn, the $n^{th}$ PWM signal PWMn, and the input voltage Vin, in a manner analogous to how the CSR signal generator 1224 generates the first CSR signal RAMP1. Each of the first to $n^{th}$ CSR signals RAMP1 to RAMPn is generated independently of others of the first to $n^{th}$ CSR signals RAMP1 to RAMPn.

An operation of the signal generator 1280 is similar to that of the signal generator 880 described above with reference to FIG. 8, except that the signal generator 1280 provides a selected signal SS to the plurality of second comparators 1225-1 to 1225-*n*, rather than a single second comparator (e.g., the second comparator 825 of FIG. 8). Thus, detailed descriptions of the operation of the signal generator 1280 will be omitted herein for the interest of brevity.

In the switching power supply 1200 including the signal generator 1280, a current imbalance among a plurality of currents $I_{L1}$ to $I_{Ln}$, which respectively flow through the plurality of inductors L1 to Ln, is reduced compared to a conventional n-phase switching power supply. For example, a difference between two DC levels of a pair of the plurality of currents $I_{L1}$ to $I_{Ln}$ is smaller compared to a corresponding difference in the conventional n-phase switching power supply. As a result, an electrical and thermal stress due to the current imbalance on one or more of the plurality of inductors L1 to Ln is reduced compared to the conventional n-phase switching power supply.

Although the switching power supply 1200 includes the signal generator 1280, which has substantially the same configuration as the signal generator 880 of FIG. 8, embodiments of the present disclosure are not limited thereto. In other embodiments, the switching power supply 1200 includes the signal generator 1280, which has substantially the same configuration as the signal generator 280 of FIG. 2, the signal generator 980 of FIG. 9, or the signal generator 1080 of FIG. 10.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A switching power supply comprising:
    a signal generator receiving a first signal, generating a second signal using the first signal, and providing one of the first signal and the second signal as a selected signal based on a first frequency of the first signal, the first signal having a first ripple amplitude, the second signal having a second ripple amplitude less than the first ripple amplitude;
    a controller generating a modulation signal in response to the selected signal; and
    a power converter converting an input signal into an output signal in response to the modulation signal.

2. The switching power supply of claim 1, wherein the first frequency of the first signal is higher than a second frequency of the second signal, and wherein the signal generator provides the second signal as the selected signal in response to the first signal having the first frequency that is equal to or greater than a threshold frequency.

3. The switching power supply of claim 1, wherein the signal generator provides the first signal as the selected signal in response to the first signal having the first frequency that is lower than a threshold frequency.

4. The switching power supply of claim 1, wherein the signal generator includes a frequency detector comparing the first frequency of the first signal to a threshold frequency and generating a transition signal according to the comparison result.

5. The switching power supply of claim 4, wherein the comparison result is a first comparison result, and
    wherein the frequency detector includes:
    a low-pass filter converting the first signal into a filtered signal;
    an offset circuit causing the filtered signal to have a DC value that is lower than a DC value of the first signal by a predetermined offset value;
    a first comparator comparing the first signal and the filtered signal to output a second comparison result;
    a first one-shot pulse generator generating a pulse signal in response to the second comparison result; and
    a frequency determining circuit generating the transition signal in response to the pulse signal.

6. The switching power supply of claim 5, wherein the frequency determining circuit includes:
    a second one-shot pulse generator generating a first control pulse signal in response to the pulse signal;
    a third one-shot pulse generator generating a second control pulse signal in response to a reference pulse signal;
    a capacitor having a first end and a second end, the second end being connected to a ground;
    a first switching device causing a first current to flow into the capacitor to charge the capacitor in response to the first control pulse signal;
    a second switching device causing a second current to flow from the capacitor to discharge the capacitor in response to the second control pulse signal; and
    a second comparator comparing an intermediate voltage at the first end of the capacitor to a threshold voltage to output the transition signal.

7. The switching power supply of claim 4, wherein the signal generator further includes:
    a low-pass filter converting the first signal into the second signal;
    a first switching device transmitting the second signal as the selected signal in response to the transition signal having a first logic value; and
    a second switching device transmitting the first signal as the selected signal in response to the transition signal having a second logic value.

8. The switching power supply of claim 7, wherein the controller includes:
    a first comparator comparing the first signal to a threshold signal and outputting a set signal;
    a second comparator comparing the selected signal to a ramp signal and outputting a reset signal; and
    a flip-flop generating the modulation signal in response to the set signal and the reset signal.

9. The switching power supply of claim 4, wherein the selected signal is a reset signal, wherein the controller includes:

a first on-time controller generating a first reset control signal in response to the first signal; and a second on-time controller generating a second reset control signal, an on-time of the second reset control signal being substantially constant, and wherein the signal generator further includes:

a first logic gate providing a first logic output signal as the reset signal in response to the first reset control signal and the transition signal having a first logic value; and a second logic gate providing a second logic output signal as the reset signal in response to the second reset control signal and the transition signal having a second logic value.

10. The switching power supply of claim 4, wherein the controller includes a threshold generator generating a threshold signal, and wherein the signal generator further includes:

a first switching device transmitting the threshold signal as the selected signal in response to the transition signal having a first logic value; and a second switching device transmitting the first signal as the selected signal in response to the transition signal having a second logic value.

11. The switching power supply of claim 1, wherein the signal generator includes a frequency detector comparing the first frequency of the first signal to a threshold frequency and generating first and second resistance control signals in response to the comparison result.

12. The switching power supply of claim 11, wherein the signal generator further includes:

a low-pass filter converting the first signal into the second signal;

a first variable resistor transmitting a portion of the first signal as a first component of the selected signal in response to the first resistance control signal; and a second variable resistor transmitting a portion of the second signal as a second component of the selected signal in response to the second resistance control signal.

13. The switching power supply of claim 12, wherein the first variable resistor has a first resistance value and a second variable resistor has a second resistance value, and wherein a ratio of the first resistance value over the second resistance value increases in response to the first signal having the first frequency that is equal to or greater than the threshold frequency.

14. The switching power supply of claim 11, wherein the controller includes a threshold generator generating a threshold signal, and wherein the signal generator further includes:

a first variable resistor transmitting a portion of the first signal as a first component of the selected signal in response to the first resistance control signal; and a second variable resistor transmitting a portion of the threshold signal as a second component of the selected signal in response to the second resistance control signal.

15. A method for controlling a switching power supply, the method comprising:

generating a second signal based on a first signal, the first signal having a first ripple amplitude, the second signal having a second ripple amplitude less than the first ripple amplitude;

providing one of the first signal and the second signal as a selected signal based on a first frequency of the first signal;

generating a modulation signal in response to the selected signal; and converting an input signal to an output signal in response to the modulation signal.

16. The method of claim 15, wherein the first frequency of the first signal is higher than a second frequency of the second signal, the method further comprising:

providing the second signal as the selected signal in response to the first signal having the first frequency that is equal to or greater than a threshold frequency.

17. The method of claim 15, further comprising:

comparing the first frequency of the first signal to a threshold frequency; and generating a transition signal in response to the comparison result.

18. The method of claim 17, wherein the comparison result is a first comparison result, and wherein comparing the first frequency of the first signal to the threshold frequency includes:

converting the first signal into a filtered signal;

causing the filtered signal to have a DC value that is lower than a DC value of the first signal by a predetermined offset value;

comparing the first signal and the filtered signal to output a second comparison result; and generating a pulse signal in response to the second comparison result.

19. The method of claim 18, wherein generating the transition signal includes:

generating a first control pulse signal in response to the pulse signal;

generating a second control pulse signal in response to a reference pulse signal;

causing a first current to flow into a capacitor to charge the capacitor in response to the first control pulse signal;

causing a second current to flow from the capacitor to discharge the capacitor in response to the second control pulse signal; and comparing an intermediate voltage at an end of the capacitor to a threshold voltage to output the transition signal.

20. A switching power supply comprising:

a signal generator providing a selected signal according to a first signal and a second signal, the first signal having a first ripple amplitude, the second signal having a second ripple amplitude less than the first ripple amplitude;

a controller generating a modulation signal in response to the selected signal; and a power converter converting an input signal into an output signal in response to the modulation signal, wherein the signal generator includes a frequency detector comparing a first frequency of the first signal to a threshold frequency and generating a transition signal according to the comparison result.

* * * * *